United States Patent [19]

Itoh et al.

[11] Patent Number: 4,695,592

[45] Date of Patent: Sep. 22, 1987

[54] HYDROPHILIZED POROUS MEMBRANE AND PRODUCTION PROCESS THEREOF

[75] Inventors: Hajime Itoh, Hiroshima; Kazutami Mitani, Ohtake, both of Japan

[73] Assignee: Mitsubishi Rayon Co., Ltd., Tokyo, Japan

[21] Appl. No.: 70

[22] Filed: Jan. 2, 1987

[30] Foreign Application Priority Data

Jan. 7, 1986 [JP] Japan .................................. 61-000951
Sep. 19, 1986 [JP] Japan .................................. 61-221465

[51] Int. Cl.$^4$ .............................................. C08J 9/40
[52] U.S. Cl. ...................................... 521/54; 210/490; 210/500.38; 521/53; 521/134; 521/905
[58] Field of Search ........................... 210/490, 500.38; 521/53, 54, 134, 905

[56] References Cited

U.S. PATENT DOCUMENTS 3,795,720  3/1974  Schwarz ............................. 521/134
4,252,907  2/1981  Ogasa .................................. 521/134

*Primary Examiner*—Morton Foelak
*Attorney, Agent, or Firm*—Oblon, Fisher, Spivak, McClelland & Maier

[57] ABSTRACT

The present invention discloses a hydrophilized porous membrane with a crosslinked hydrophilic polymer, which is composed principally of diacetone acrylamide, held physically on at least a part of the pore walls of a starting porous polyolefin membrane, as well as its production process. This hydrophilized porous polyolefin membrane has long-lasting hydrophilicity and good mechanical strength. Its components are dissolved out only minimally in application.

5 Claims, No Drawings

HYDROPHILIZED POROUS MEMBRANE AND PRODUCTION PROCESS THEREOF

BACKGROUND OF THE INVENTION (1) Field of the Invention

This invention relates to hydrophilized porous membranes useful in such fields as water treatment and blood purification and to their production process, and more specifically to porous polyolefin membranes with their pores covered by a hydrophilic polymer and to a production process thereof.

(2) Description of the Prior Art

The fields of application of porous polyolefin membranes are expanding rapidly due to their excellent mechanical properties and chemical resistance. Porous polyolefin membranes are however hydrophobic and when used as is, water is allowed to permeate therethrough with difficulty. A hydrophilizing treatment is therefore indispensable to have hydrophilic liquids including water permeate therethrough. A variety of methods have been studied with a view toward imparting hydrophilicity through surface modification of polyolefin membranes. Hydrophilizing methods, which have been proposed for film-like materials featuring smooth surfaces, cannot be simply applied to impart hydrophilicity to porous membranes having complex surface configurations.

As hydrophilizing methods for porous polyolefin membranes, there have been known the organic solvent wetting and water substituting method in which the entire surface of a porous polyolefin membrane, inclusive of minute pores, is subjected to a wetting treatment with an organic solvent having good miscibility with water such as an alcohol or ketone, followed by substitution of water for the organic solvent; the physical adsorption method in which a hydrophilic material such as polyethylene glycol or a surfactant is adsorbed on a surface of a porous membrane so as to impart hydrophilicity to the porous membrane (Japanese Patent Laid-Open Nos. 153872/1979 and 24732/1984); and the chemical surface modification method in which a porous membrane is exposed to radiation while holding a hydrophilic monomer on a surface of the membrane (Japanese Patent Laid-Open No. 38333/1981) or the porous structure of a hydrophobic resin is subjected to a plasma treatment in a state impregnated with a water-soluble high-molecular material and a surfactant (Japanese Patent Laid-Open No. 157437/1981).

In the organic solvent wetting and water substituting method, if water is once lost from minute pores during storage or use, the part containing these water-free minute pores regains hydrophobicity and no longer permits the permeation of water therethrough. Accordingly, since it is always necessary to keep water around the porous membrane, the porous membrane is difficult to handle. Although the physical adsorption method is easy to practice, the hydrophilic material drops off if the resulting porous membrane is used over a long period of time. Therefore, this method cannot be regarded as a fully satisfactory hydrophilizing method. The conventional chemical surface modification method is accompanied by one or more problems. It is difficult to impart uniform hydrophilicity in the direction of the thickness of a membrane, when the porous membrane is exposed to radiation or subjected to the plasma treatment. If one attempts to apply a hydrophilizing treatment uniformly over the entire thickness of a porous membrane when the membrane has a large thickness or is in the form of a hollow fiber, the mechanical strength of the matrix of the porous membrane is unavoidably reduced, leading to damage.

SUMMARY OF THE INVENTION

An object of this invention is to provide a porous polyolefin membrane holding firmly a hydrophilic polymer over almost all of the pore walls of the membrane, imparted with hydrophilicity of excellent durability and having sufficient mechanical strength.

In one aspect of this invention, there is thus provided a hydrophilized porous membrane, wherein a crosslinked hydrophilic polymer composed principally of diacetone acrylamide is held on at least a part of the pore walls of a starting porous polyolefin membrane.

In another aspect of this invention, there is also provided a process for the production of the aforementioned hydrophilized porous membrane, which comprises the steps of (A) holding diacetone acrylamide, a crosslinkable monomer and a polymerization initiator on at least a part of the pore walls of a starting porous polyolefin membrane, and (B) heating them to polymerize these monomers.

DESCRIPTION OF THE PREFERRED EMBODIMENTS

In the present invention, the polyolefin forming the porous polyolefin membrane includes a polymer or copolymer composed principally (80 wt.% or more) of one or more monomers selected from the group consisting of ethylene, propylene, 4-methyl-1-1-pentene and 3-methyl-1-butene, and the fluorinated (co)polymer thereof. The starting porous membrane may be in any form such as a hollow fiber membrane, planar membrane or tubular membrane. Although starting porous membranes having various pore sizes may be employed depending on the end use, the preferred starting porous membranes may include those having a membrane thickness of about 20–200 $\mu$m, a porosity of about 20–90 vol.%, a water permeability of about 0.001–10 l/min·hr·mmHg as measured by the alcohol-dependent hydrophilizing method, and a pore size of about 0.01–5 $\mu$m.

There are various pore structures of porous polyolefin membranes. Of these, porous polyolefin membranes obtained by the stretching method can be used preferably from the viewpoint that their porosity is high and they are hence less susceptible to performance drop due to clotting. Porous membranes obtained by the stretching method are those having a slit-like pore structure in which minute spacings (pores) formed by microfibriles and knot portions are communicated mutually in a three-dimensional pattern. They may be produced, for example, by the process disclosed in U.S. Pat. No. 4,055,696 or 4,401,567.

As to the shapes of the porous membranes, hollow fiber membranes are preferably used because they have large membrane areas per unit volume.

By the term "at least a part of the pore walls" of the porous polyolefin membrane of this invention, on which a crosslinked hydrophilic polymer is held, is meant a part or the entire part of the pore walls.

It is sufficient if the crosslinked hydrophilic polymer is held on the pore walls to the extent that an acceptable flow rate is achieved through the membrane when the porous membrane is used by allowing water to permeate through its pores under the usual intermembrane pressure difference. It is not absolutely necessary to cover the entire pore walls with the polymer. Furthermore, the hydrophilic polymer may be held or may not be held on the outer surfaces of the porous membrane.

By the term "physically held" as used herein means that the polymer is bonded or otherwise adhered firmly to the pore walls to such a degree that the polymer does not drop off easily in the course of storage or use of the porous membrane. The polymer may firmly adhere to the pore walls by anchorage effects. Alternatively, the polymer may be adherently crosslinked in such a manner that it encloses the microfibriles or knot portions, which form the slit-like pores.

A hydrophilic polymer may also be held on the pore walls of a porous polyolefin membrane primarily by chemical bonds. This type of bonding is however not preferable, because the matrix of the membrane, such as microfibriles, is damaged upon bonding the polymer thereon, resulting in a modification to the pore structure of the porous membrane or a reduction to its mechanical strength. In the hydrophilized porous membrane of this invention, some chemical bonds may however exist between the porous polyolefin membrane and the crosslinked hydrophilic polymer so long as the existence of the chemical bonds does not raise any practical problem.

In the present invention, a crosslinked hydrophilic polymer composed principally of diacetone acrylamide is held on the pore walls of a porous polyolefin membrane. This polymer has been selected for the following reasons. Compared with other polymers, (1) the above polymer can adhere firmly to a polyolefin and can hence be held firmly there; (2) it can be held almost uniformly over substantially the entire pore walls of a porous polyolefin membrane; (3) it has a suitable degree of hydrophilicity; and (4) it is substantially water-insoluble.

The term "crosslinked hydrophilic polymer composed principally of diacetone acrylamide" as used herein means a polymer containing 50 wt.% or more of diacetone acrylamide [N-(1,1-dimethyl-3-oxobutyl)acrylamide] as a monomer component. As a copolymerizable monomer also composing the polymer, a crosslinkable monomer is used. However, a non-crosslinkable monomer may also be used in combination.

Such a copolymerizable monomer is a monomer which is copolymerizable with diacetone acrylamide and contains at least one polymerizable unsaturated bond such as vinyl bond or allyl bond, and has a good solvent common to diacetone acrylamide.

As an exemplary crosslinkable monomer, may be mentioned a monomer containing at least two polymerizable unsaturated bonds such as those mentioned above, or a monomer containing one of such polymerizable unsaturated bonds as those mentioned above and at least one functional group capable of forming a chemical bond by, for example, a condensation reaction. Illustrative examples of such a crosslinkable monomer may include N,N'-methylenebisacrylamide, N-hydroxymethylacrylamide, N-hydroxymethylmethacrylamide, triallyl cyanurate, triallyl isocyanurate, divinyl benzene, 2,2-bis (4-methacryloyloxypolyethoxyphenyl)propane, ethylene di(meth)acrylate, polyethyleneglycol di(meth)acrylate, trimethylolpropane tri(meth)acrylate, pentaerythritol tetra(meth)acrylate, trimethylolethane tri(meth)acrylate, butanediol di(meth)acrylate, hexanediol di(meth)acrylate, diallyl phthalate and 1,3,5-triacryloyl hexahydroxy-s-triazine.

On the other hand, as exemplary non-crosslinkable monomers, may be mentioned dimethylmethacrylamide, vinylpyrrolidone, acrylic acid, methacrylic acid, hydroxyethyl methacrylate, styrenesulfonic acid, sodium styrenesulfonate, sodium sulfoethylmethacrylate, vinylpyridine and vinyl methyl ether.

Regarding the proportions of diacetone acrylamide and copolymerizable monomer which in combination form the crosslinked hydrophilic copolymer, it is preferable to use the copolymerizable monomer in an amount of about 0.5–100 parts by weight per 100 parts by weight of diacetone acrylamide.

Since the hydrophilic polymer held on the pore walls of the porous polyolefin membrane is a crosslinked polymer in this invention, the hydrophilic polymer held on the pore walls of the porous polyolefin membrane undergoes only a small degree of swelling in water and has almost no potential danger to plug the pores. The hydrophilic polymer has further advantages that its stability is good and its components are dissolved out very little in water. The porous membrane is therefore effective in the field of water treatment or blood purification, where dissolved components cause problems even at trace levels.

By contrast, a diacetone acrylamide polymer having no crosslinked structure undergoes swelling in water, reduces pore size and sometimes plugs pores. It also dissolves in water, albeit in a small amount. A porous membrane with such a hydrophilic polymer held thereon has a potential danger of developing various problems upon its application.

The greater the degree of hydrophilicity of the crosslinked polymer, the better the performance of water permeation by the resulting porous membrane. A water-soluble and crosslinkable monomer having a sufficient degree of hydrophilicity is preferable as the crosslinkable monomer for the formation of the crosslinked polymer, since water is allowed to permeate evenly through the entire membrane area of the resulting porous membrane in a short period of time after starting its use.

Such a water-soluble and crosslinkable monomer is a crosslinkable monomer having a solubility of 1.0 g/dl or greater in water of 30° C. As illustrative examples of the crosslinkable monomer, may be mentioned N-hydroxymethylacrylamide, N-hydroxymethylmethacrylamide and N,N'-methylenebisacrylamide.

The amount of the crosslinked hydrophilic polymer held on at least a part of pore walls of a porous polyolefin membrane according to this invention is dependent on the porosity and pore size of the porous polyolefin membrane but is preferably about 0.5–100 wt. % based on the weight of the porous polyolefin membrane. If the amount of the thus-held crosslinked polymer is smaller than the lower limit, it is impossible to impart sufficient hydrophilicity to the porous membrane. On the other hand, any amounts greater than the upper limit cannot improve the hydrophilicity of the porous membrane any further. On the contrary, the volume of each pore is reduced so that the performance of water permeation is lowered. The amount of the thus-held polymer is more preferably about 0.5–50wt. %, and most preferably about 1–30 wt. %.

A description will next be made of processes for the production of the hydrophilized porous membranes of this invention.

A variety of processes may be employed to hold the crosslinked hydrophilic polymer on the pore walls of the porous polyolefin membrane of this invention. The following method may be employed by way of example: A solution of diacetone acrylamide and the aforementioned copolymerizable monomer (hereinafter called "monomers" collectively) and a polymerization catalyst dissolved in a suitable solvent such as an organic solvent or water is prepared. A starting porous polyolefin membrane is then impregnated by the above solution by immersing the starting porous polyolefin membrane in the solution or by fabricating a membrane module with the starting porous polyolefin membrane and then causing the solution to penetrate under pressure into the porous polyolefin membrane, followed by evaporation of the solvent for removal. It is possible to cause the monomers to adhere almost uniformly over the entire surface of the porous membrane without plugging the pores of the porous membrane by using the monomers in a form diluted with a solvent. The amounts of the monomers to be adhered can be adjusted by changing the concentrations of the monomers in the solution or changing the immersion or penetration time.

After holding these monomers on at least a part of the pore walls of the porous membrane in the above-described manner, the solvent is removed and the monomers are then polymerized. It is hence possible to hold the resulting crosslinked hydrophilic polymer on at least said part of the pore walls of the porous polyolefin membrane.

The solvent useful upon preparation of the above-described solution includes water or an organic solvent which has a boiling point lower than the monomers and can dissolve the monomers therein. When a polymerization catalyst is added, it is desirable to use a solvent which can also dissolve the polymerization catalyst.

As such organic solvents, may be mentioned alcohols such as methanol, ethanol, propanol and isopropanol, ketones such as acetone, methyl ethyl ketone and methyl isobutyl ketone, ethers such as tetrahydrofuran and dioxane and ethyl acetate. Although no particular limitation is imposed on the organic solvent, the organic solvent preferably has a boiling point below about 100° C. and more preferably below about 80° C. because such a boiling point facilitates the removal of the solvent before the polymerization step.

Since the surface of a porous polyolefin membrane is hydrophobic, the monomers tend to be adsorbed on the pore walls with their hydrophilic groups oriented outward upon penetration of an aqueous solution containing the monomers into the pores, especially when water is used as a solvent. If the monomers are fixed in this state by polymerization, hydrophilicity can be imparted with extremely high efficiency. When water is used as a solvent, it is possible to bring the starting porous membrane into contact with the resulting solution without any pretreatment. It is also possible to bring the starting porous membrane into contact with the solution after subjecting the pore walls of the porous membrane to a wetting treatment with an alcohol or ketone in advance.

By contrast, use of an organic solvent as the solvent has the merit that the resulting solution is allowed to penetrate into pores of a porous polyolefin membrane in a short period of time and that the solvent can be removed with ease from the pores.

Even when the monomers are polymerized in a state oriented at random on the pore walls instead of making use of the above-mentioned oriented adsorption, the resulting hydrophilic polymer has a greater degree of hydrophilicity compared to polyolefins. Compared with pore walls not holding the crosslinked polymer thereon, pore walls with the crosslinked polymer held thereon have higher hydrophilicity. It is hence possible to obtain the porous polyolefin membrane in a form imparted with hydrophilicity.

Need for a polymerization initiator is dependent on the manner of polymerization. A polymerization initiator is employed in heat polymerization or photopolymerization, but no polymerization initiator is required for radiation polymerization.

In the case of heat polymerization, it is possible to use various peroxides, azo compounds and redox initiators which are known as radical polymerization initiators. As their examples, may be mentioned azo compounds such as 2,2'-azobisisobutylonitrile, 2,2'-azobiscyclopropylpropionitrile, 2,2'-azobis-2,4-dimethylvaleronitrile, and 2,2'-azobis-2,3,3-trimethylbutylonitrile; peroxides such as acetyl peroxide, propionyl peroxide, butyryl peroxide, isobutyryl peroxide, succinyl peroxide, benzoyl peroxide, benzoylisobutyryl peroxide, β-allyloxypropionyl peroxide, hexanoyl peroxide, 3-bromobenzoyl peroxide and bis-(t-butylcyclohexyl) peroxydicarbonate; and persulfates such as potassium persulfate and ammonium persulfate.

A water-soluble polymerization initiator such as azobisisobutyramidine or 4,4'-azobis-4-cyanopentanoic acid is preferable especially when water is used as a solvent. However, the above-mentioned water-insoluble polymerization initiators may also be employed because they can still be dispersed in water owing to the surface activity of the monomers themselves.

In the case of photopolymerization, it is possible to use photopolymerization catalysts, for example, benzophenone, benzoinmethyl ether, benzyl dimethyl ketal, fluorenone, 4-bromobenzophenone, 4-chloro-benzophenone, methyl 2-benzoylbenzoate, benzoyl peroxide, anthraquinone, biacetyl and uranyl nitrate. They may also be used in suitable combination.

The proportions of the monomers and the solvent in a solution may be suitably chosen in view of the type of the solvent, the target amount of the resulting crosslinked hydrophilic polymer to be held and other factors. Per 100 parts by weight of the monomers, the solvent may be used in an amount of about 50–10,000 parts by weight, and more preferably, about 200–5,000 parts by weight.

The proportions of diacetone acrylamide and the copolymerizable monomer in the monomer mixture may be suitable selected in view of the degree of hydrophilicity of the copolymerizable monomer, target copolymerization ratio and crosslinking degree and other factors. Per 100 parts by weight of diacetone acrylamide, the copolymerizable monomer may be used in an amount of about 0.5–100 parts by weight, and more preferably, about 1–90 parts by weight.

Further, per 100 parts by weight of the monomers, the polymerization initiator may be used in an amount of about 0.001–100 parts by weight with about, 0.01–30 parts by weight being more preferred and about 0.1–20 parts by weight being particularly preferred.

If the solvent is used in any amount greater than the upper limit of the above range relative to the monomers, the amounts of the monomers to be held on the pore walls of the porous membrane will be too little to hold the resulting crosslinked hydrophilic polymer in a sufficient amount. If the amount of the solvent is smaller than the lower limit, difficulties will be encountered in controlling the amount of the resulting polymer to be held. In addition, the crosslinked polymer will be held too much on the pore walls and within the pores, leading to plugging of the pores. It is hence not desirable to use the solvent in any amounts outside the above range.

When a starting porous polyolefin membrane is subjected to an immersion or penetration treatment by using the above-described solution, the immersion or penetration time may be about 0.5 second-30 minutes. This treatment can be effected in a shorter period of time as the wetting characteristics of the solution for the porous polyolefin membrane become better.

After holding the monomers and, in some instances, the polymerization initiator on at least a part of the pore walls of the porous polyolefin membrane in the above-described manner, the accompanying extra solution is removed and if necessary the solvent penetrated in pores is caused to evaporate, followed by a polymerization step.

If the temperature becomes unduly high during the evaporation and removal of the solvent, the polymerization is caused to proceed partly while the solvent still remains. The polymerization thus takes place in the interior of pores instead of the pore walls of the porous membrane and as a result, some pores may be plugged. Use of such a high temperature is therefore not desirable. In view of this possible problem, it is preferable to control the temperature within a range of 10-40° C. during the removal of the solvent.

In the present invention, polymerization processes such as heat polymerization, photopolymerization, radiation polymerization and plasma polymerization may be used.

In heat polymerization, the polymerization temperature is above the decomposition temperature of the above-mentioned polymerization catalyst. It is also desirable not to exceed a temperature at which the membrane structure of the porous polyolefin membrane is changed and the matrix of the membrane is damaged. It is generally preferable to use a temperature of 30-100° C. Although the heating time depends on the type of polymerization catalyst and the heating temperature, it is generally about 1 minute-5 hours and more preferably about 15 minutes-3 hours in a batch process. Since the heat transfer efficiency is higher in a continuous process, the polymerization can be achieved in a shorter period of time. Therefore, the heating time may usually be about 10 seconds-60 minutes, with about 20 seconds-10 minutes being preferred.

In photopolymerization, ultraviolet rays or visible light can be used as the light to be irradiated. As the ultraviolet ray source, a low-pressure mercury lamp, high-pressure mercury lamp, xenon lamp, arc lamp or similar lamp may be used.

It is necessary to choose suitable conditions for the irradiation of the light. When a mercury vapor lamp is used as an exemplary light source, it is necessary to set the input at about 10-300 W/cm and to irradiate light for about 0.5-300 seconds at a distance of about 10-50 cm so that the porous polyolefin membrane is exposed to light with energy of about 0.001-10 joule/cm$^2$, or more preferably about 0.05-1 joule/cm$^2$.

If the intensity of the irradiated light is too small, it is difficult to achieve sufficient hydrophilization. On the other hand, a high irradiation intensity causes considerable damage to the porous polyolefin membrane. It is hence desirable to choose suitable light irradiation conditions with care while taking the membrane thickness and other factors into consideration.

In the case of radiation polymerization, the polymerization can be conducted, for example, by irradiating electron beams to about 10-50 Mrad at a temperature below 120° C., more preferably below 100° C., by means of an electron beam irradiation apparatus.

If oxygen exists in the atmosphere upon polymerization, the polymerization reaction is significantly impaired. It is therefore desirable to effect the polymerization in a substantially oxygen-free state, for example, in an inert gas atmosphere such as a nitrogen gas atmosphere or in vacuo.

When the crosslinked hydrophilic polymer is formed by using a crosslinkable monomer, the crosslinking reaction may be allowed to proceed concurrently with the polymerization reaction. Alternatively, it may be effected subsequent to the formation of a copolymer. The crosslinking reaction, where it depends on condensation, may be effected by using the heat of the polymerization reaction or by heating the polymerization system externally.

When a condensation-dependent crosslinking reaction is used, the crosslinking reaction may be conducted by dissolving an uncrosslinked copolymer of diacetone acrylamide and a crosslinkable monomer, which copolymer has been prepared beforehand, in a solvent, holding the resultant solution on the pore walls of the porous polyolefin membrane and then subjecting the copolymer to the crosslinking reaction in that state. Here, the uncrosslinked copolymer preferably has a molecular weight of about 10,000-500,000. If its molecular weight is unduly large, it is difficult to have the copolymer penetrate into the pores of the porous polyolefin membrane. Use of such a large molecular weight is therefore not desirable. The more preferable molecular weight is about 50,000-300,000.

As described above, various polymerization processes can be employed in the present invention. It is however most preferable to effect the polymerization by thermal energy. Since use of thermal energy allows even pore portions of the porous membrane to be heated evenly, the monomers can be uniformly polymerized over the entire pore walls on which they are held. Heat polymerization has another advantage in that the polymerization can be achieved without modification of the membrane structure and deterioration of the membrane matrix if the polymerization temperature is suitably chosen. By contrast, the use of light energy involves the problem that the light cannot sufficiently reach the pore portions of the porous membrane due to scattering of the light. If the irradiation intensity of the light is increased, a further problem is developed in that the deterioration of the matrix of the membrane is accelerated. Furthermore, the use of radiation energy is accompanied by the drawback that the membrane matrix is liable to accelerated deterioration. When these polymerization processes are employed, it is hence indispensable to choose with care polymerization conditions that do not cause deterioration of the membrane matrix.

Since the monomers or uncrosslinked copolymer held on the pore walls of the porous polyolefin membrane are polymerized or crosslinked in situ by any of the above-described polymerization processes, at least a part of the pore walls of the porous membrane is covered by the resultant polymer.

It is also desirable to remove unnecessary materials such as unreacted monomers or free polymer with an appropriate solvent subsequent to the formation of the crosslinked hydrophilic polymer. As the solvent, water, organic solvents or their mixed solvents can be used either singly or in combination.

The hydrophilized porous membrane of this invention can be produced in the above-described manner. As a particularly preferable process, may be mentioned heating and polymerizing monomers, which include diacetone acrylamide and a water-soluble crosslinkable monomer, and in some instances, a polymerization initiator on at least a part of the pore walls of a porous polyolefin membrane so that they are held there.

The use of a water-soluble crosslinkable monomer as the copolymerizable monomer can suppress the swelling of the resulting hydrophilic polymer in water, whereby the amounts of components to be dissolved out can be reduced further and at the same time, the hydrophilized porous membrane exhibits excellent water permeation performance. A hydrophilized porous membrane produced by heat polymerization has the merit that the crosslinked polymer is held uniformly in the direction of the thickness of the membrane and the matrix of the membrane is substantially free of damage.

The individual steps of the process of this invention have been separately described above. It should however be noted that such individual steps as holding of the monomers on the pore walls of a porous polyolefin membrane, removal of the solvent, polymerization and washing after the polymerization can be performed continuously in the present invention.

According to the present invention, it is possible to hold a crosslinked hydrophilic polymer firmly on the pore walls in a porous polyolefin membrane without lowering the mechanical strength of the matrix of the porous polyolefin membrane.

Compared with a porous polyolefin membrane holding no hydrophilic polymer thereon, the hydrophilized porous membrane of this invention requires a significantly low water penetration pressure and therefore has extremely good water permeation performance. Since the crosslinked polymer is held firmly on the pore walls of the porous polyolefin membrane, its components are dissolved out very little even in a dissolving-out test in warm water. The hydrophilized porous membrane of this invention can therefore be used successfully in such fields as water treatment and blood purification, where high-temperature treatments may be involved.

In particular, a hydrophilized porous membrane obtained from a polyolefin membrane rendered porous by the stretching technique has the merit that it exhibits good hydrophilicity and that the increase in filtration resistance due to plugging upon application of the membrane is minimized.

The present invention will hereinafter be described specifically by the following Examples. In each Example, a porous polyolefin membrane rendered porous by the stretching technique in which slit-like spacings (pores) formed by fibriles and knots communicated three-dimensionally was used and the pore size of the porous membrane was defined in terms of the average width and length of the slit-like spacings. Water penetration pressure, water permeability by the alcohol-dependent hydrophilizing method, and water permeability after the holding of a polymer thereon were each measured in accordance with the following methods by fabricating test membrane modules each of which had an effective membrane area of 163 cm$^2$. In addition, the amount of polymer held, the knot strength and the cumulative dissolution (%) were also measured by the following methods, and the evaluation of the state of coverage of the pore walls by the polymer was effected by the following method.

The solubilities of N-hydroxy-methylacrylamide, N,N'-methylene bisacrylamide and triallyl isocyanurate which were used in the following Examples were 197 g/dl, 3 g/dl and 0.1 g/dl respectively.

(1) Water penetration pressure:

Water of 25° C. was fed from one side (the inside of hollow fibers in the case of a hollow fiber membrane) of a test membrane module while raising the water pressure at a rate of 0.1 kg/cm$^2$ per minute. Water pressures were separately measured when the cumulative quantity of penetrated water had reached 30 ml and 50 ml. The water pressures and quantities of penetrated water were plotted along the axis of abscissa and the axis of ordinate, respectively. The pressure at the crossing point between the straight line, which connected the thus-plotted two points, and the axis of abscissas was determined. The pressure was employed as the water penetration pressure.

(2) Water permeability by the alcohol-dependent hydrophilizing method:

Ethanol was fed under pressure at a flow rate of 25 ml/min for 15 minutes from one side (the inside of hollow fibers in the case of a hollow fiber membrane) of a test membrane module which had not been subjected to any hydrophilizing treatment, whereby the porous membrane was wet fully to the interior of its pores with ethanol. Thereafter, water was caused to flow at a flow rate of 100 ml/min for 15 minutes so that the ethanol contained within the pores was substituted by water. Then, water of 25° C. was caused to flow from one side (the inside of hollow fibers in the case of a hollow fiber membrane) of the test membrane module and the quantity of permeated water was measured at an intermembrane pressure difference of 50 mmHg. The water permeability (l/m$^2$·hr·mmHg) was determined from the quantity of permeated water.

(3) Amount of crosslinked hydrophilic polymer held:

The nitrogen content was determined by elemental analysis. On the assumption that the nitrogen had been derived only from the crosslinked hydrophilic polymer, and that the thus-formed crosslinked hydrophilic polymer had the same composition as the monomer composition, each polymer held on a porous polyolefin membrane was measured in terms of wt.% based on the unit weight of the porous polyolefin membrane.

(4) Evaluation of the state of coverage of pore walls:

Each porous membrane was immersed for 1 minute in the standard solution (blue) for wetting tests described in JIS K6768(1971), which solution has a surface tension of 54 dyn/cm. Thereafter, the membrane was dried in air, and a transverse cross-section of the porous membrane was observed through an optical microscope to observe the state of distribution of the colored crosslinked hydrophilic polymer.

(5) Knot strength:

The knot strength of each porous hollow fiber membrane was measured in accordance with JIS L1013.

(6) Cumulative dissolution (%):

Each porous membrane was immersed in warm water of 65° C. in an amount 10 times the weight of the membrane. At a constant interval, the quantity of the organic carbon atoms in the warm water was analyzed. On the assumption that the quantity of the whole organic carbon atoms was derived only from the crosslinked hydrophilic polymer of the composition assumed in the above test (3), the cumulative dissolution was calculated. Then, the cumulative dissolution (wt.%) was determined relative to the amount of the crosslinked polymer held before the dissolving-out treatment.

(7) Water permeability after holding the crosslinked hydrophilic polymer:

After feeding water at a pressure of 2 kg/cm$^2$ for 3 hours from one side of a test membrane module fabricated with a porous membrane holding a crosslinked hydrophilic polymer thereon (the inside of hollow fibers in the case of a hollow fiber membrane), water of 25° C. was caused to flow from the other side of the test membrane module. The quantity of permeated water was measured at an intermembrane pressure difference of 50 mmHg. The water permeability (l/m$^2$·hr·mmHg) was determined from the quantity of permeated water.

EXAMPLE 1

A porous polyethylene hollow fiber membrane having a slit-like pore with an average width of 0.4 μm and an average length of 1.8 μm, a porosity of 63%, a membrane thickness of 70 μm, an inner diameter of 270 μm, a knot strength of 394 g/fil, a water penetration pressure of 11 kg/cm$^2$, and a water permeability of 1.1 l/m$^2$·hr·mmHg as measured by the alcohol-dependent hydrophilizing method, was immersed for 10 seconds in a solution composed of 100 parts of diacetone acrylamide, 5 parts of N-hydroxymethylacrylamide, 1 part of benzoyl peroxide and 1,000 parts of acetone. The hollow fiber membrane was thereafter taken out of the solution and dried in air for 5 minutes. The porous membrane was thereafter heat-treated at 65° C. for 60 minutes in a nitrogen gas atmosphere and then immersed for 10 minutes in a 50:50 (by parts) mixed solvent of water and ethanol. By ultrasonic cleaning of the membrane for 2 minutes in warm water, unnecessary materials were washed off. The membrane was then dried in hot air to remove the solvent, thereby obtaining the porous membrane with a crosslinked hydrophilic polymer held thereon.

The water penetration pressure, water permeability, amount of the crosslinked polymer held, knot strength and cumulative dissolution (%) of the membrane were measured. The results are shown in Table 1.

The water permeation performance of the resulting hydrophilic porous membrane was excellent. The crosslinked polymer was held almost uniformly over substantially the entire pore walls of the porous membrane. In addition, the knot strength did not decrease compared to the starting porous membrane. It was found that practically no component were dissolved out after the 24th hour of dissolving-out test.

EXAMPLES 2-4

Crosslinked hydrophilic polymers were separately held on porous membranes under the same conditions as in Example 1 except that N-hydroxymethylacrylamide was used as the crosslinkable monomer in the amounts shown in Table 1.

The performance of the porous membranes obtained in the above manner was evaluated. The results are also shown in Table 1.

EXAMPLE 5

A porous polyethylene hollow fiber membrane having a slit-like pore with an average width of 0.2 μm and an average length of 0.7 μm, a porosity of 45%, a membrane thickness of 22 μm, an inner diameter of 200 μm, a water penetration pressure of 12 kg/cm$^2$ and a water permeability of 0.54 l/m$^2$·hr·mmHg as measured by the alcohol-dependent hydrophilizing method was converted into a porous membrane having a crosslinked hydrophilic polymer held thereon in the same manner as in Example 1 except that a solution composed of 100 parts of diacetone acrylamide, 5 parts of N,N'-methylene bisacrylamide, 5 parts of 2,2'-azobisisobutyronitrile and 800 parts of acetone was used as a treatment solution and the heat treatment was applied at 65° C. for 60 minutes. The performance of the porous membrane was evaluated. The results are shown in Table 1.

The crosslinked hydrophilic polymer was held almost uniformly over substantially the entire pore walls. It was also found that practically no components were dissolved out after the 24th hour of dissolving-out test.

EXAMPLES 6-8

Crosslinked hydrophilic polymers were separately held on porous membranes under the same conditions as in Example 5 except that N,N'-methylene bisacrylamide was used as the crosslinkable monomer in the amounts shown in Table 1.

The performance of the porous membranes obtained in the above manner was evaluated. The results are also shown in Table 1.

EXAMPLE 9

A planar porous polyethylene membrane, which had slit-like pores having an average width of 0.8 μm and an average length of 3.0 μm, a porosity of 70%, a membrane thickness of 42 μm, a water penetration pressure of 4.5 kg/cm$^2$ and a water permeability of 3.5 l/m$^2$·hr·mmHg as measured by the alcohol-dependent hydrophilizing method, was converted into a porous membrane having a crosslinked hydrophilic polymer held thereon in the same manner as in Example 1 except that a solution formed of 100 parts of diacetone acrylamide, 5 parts of N-hydroxymethylacrylamide, 10 parts of benzoyl peroxide and 330 parts of methyl ethyl ketone was used as the treatment solution and the heat treatment was applied at 60° C. for 60 minutes. The performance of the porous membrane was evaluated. The results are also given in Table 1.

The crosslinked hydrophilic polymer was held almost uniformly over substantially the entire pore walls. It was also found that practically no components were dissolved out after the 24th hour of dissolving-out test.

EXAMPLES 10-12

Crosslinked hydrophilic polymers were separately held on porous membranes under the same conditions as in Example 9 except that N-hydroxymethylacrylamide was used as the crosslinkable monomer in the amounts shown in Table 1.

The performance of the porous membranes obtained in the above manner was evaluated. The results are also shown in Table 1.

EXAMPLE 13

A crosslinked hydrophilic polymer was held on a porous membrane under the same conditions as in Example 1, except that 5 parts of triallyl isocyanurate was used as the crosslinkable monomer.

The performance of the porous membrane obtained in the above manner was evaluated. The results are also shown in Table 2. The crosslinked hydrophilic polymer was held almost uniformly over substantially the entire pore walls.

EXAMPLE 14

A crosslinked hydrophilic polymer was held on a porous membrane under the same conditions as in Example 5, except that 5 parts of triallyl isocyanurate was used as the crosslinkable monomer.

The performance of the porous membrane obtained in the above manner was evaluated. The results are also shown in Table 2.

EXAMPLE 15

A crosslinked hydrophilic polymer was held on a porous membrane under exactly the same conditions as in Example 5, except that a solution composed of 100 parts of diacetone acrylamide, 1 part of divinylbenzene, 0.3 part of benzoyl peroxide and 450 parts of methyl ethyl ketone was used and the immersing time and heat polymerization conditions were set at 3 seconds and at 70° C. for 60 minutes, respectively.

The performance of the above porous membrane was evaluated. The results are also shown in Table 2. The crosslinked hydrophilic polymer was held almost uniformly over substantially the entire pore walls. It was also found from the measurement of the cumulative dissolution (%) that practically no components were dissolved out after the 24th hour of dissolving-out test.

EXAMPLE 16

Using a planar porous polyethylene membrane similar to that employed in Example 9, a hydrophilized porous membrane of this invention was obtained in the same manner as in Example 9, except that a solution formed of 100 parts of diacetone acrylamide, 5 parts of triallyl isocyanurate, 5 parts of benzoyl peroxide and 300 parts of acetone was used and the immersing time and heat polymerization conditions were set at 3 seconds and at 60° C. for 30 minutes, respectively.

The performance of the above porous membrane was evaluated. The results are also shown in Table 2.

EXAMPLE 17

A hydrophilized porous membrane of this invention was obtained in the same manner as in Example 1, except that a planar porous poly-4-methyl-1-pentene membrane containing slit-like pores, the average width and length of which were 0.2 $\mu$m and 0.5 $\mu$m, respectively, and having a porosity of 43%, a membrane thickness of 35 $\mu$m and a water permeability of 0.2 l/m$^2$·hr·mmHg as measured by the alcohol-dependent hydrophilizing method was used, the amount of the benzoyl peroxide was changed to 0.5 part, and the immersion time in the solution and the heat polymerization conditions were set at 3 seconds and at 75° C. for 25 minutes, respectively. The performance of the porous membrane was evaluated. The results are also shown in Table 2. The crosslinked hydrophilic polymer was held almost uniformly over substantially the entire pore walls.

EXAMPLES 18-21

Porous polyethylene hollow fiber membrane of the same type as that used in Example 1 were continuously fed at a speed of 2 m/min through a solution tank of 10 cm long, in which each membrane was subjected to an immersion treatment. In a first pipe having a diameter of 2 cm and a length of 4 m, the accompanying solution was removed and each thus-immersed membrane was dried. Thereafter, each membrane was heated in a second pipe having a diameter of 2 cm and a length of 3 m so that the monomers were polymerized.

Four types of solutions were employed separately. Their compositions were as follows:

| | |
|---|---|
| Diacetone acrylamide | 100 parts |
| N—hydroxymethylacrylamide | See Table 2 |
| Bis-(4-tertiary-butylcyclohexyl) peroxydicarbonate | 0.5 part |
| Acetone | 660 parts |

Nitrogen gas of room temperature and hot nitrogen gas of 80° C. were caused to flow through the first and second pipes, respectively, both at a flow rate of 3 l/min.

Subsequently, the hollow fiber membranes were each allowed to pass through a 50-cm long tank filled with a 50:50 (by parts) mixed solvent of water and ethanol and then through a 1.5-m long tank from which warm water of 60° C. was overflowed, whereby the hollow fiber membranes were washed. They were dried in a hot air atmosphere, thereby obtaining hydrophilized porous membranes of this invention.

The performance of the porous membranes was evaluated. The results are also shown in Table 2. The crosslinked hydrophilic polymers were held almost uniformly over substantially the entire pore walls of those porous membranes.

TABLE 1

| | Crosslinkable monomer | | Amount of polymer held (wt. %) | Performance of hydrophilized porous membrane | | | | | | |
|---|---|---|---|---|---|---|---|---|---|---|
| | | | | Knot strength (g/fil) | Water penetration pressure (Kg/cm$^2$) | Water permeability (l/m$^2$ · hr · mmHg) | Dissolution (wt. %) | | | |
| Ex. | Kind* | Amount used (wt. parts) | | | | | 1 hr | 24 hr | 200 hr | 800 hr |
| Ex. 1 | A | 5 | 10.2 | 395 | 0.2 | 1.3 | 0.008 | 0.010 | 0.010 | 0.010 |
| Ex. 2 | A | 15 | 11.0 | 396 | 0.2 | 1.0 | 0.008 | 0.010 | 0.010 | 0.010 |
| Ex. 3 | A | 80 | 15.0 | 395 | 0.2 | 0.91 | 0.007 | 0.009 | 0.010 | 0.010 |
| Ex. 4 | A | 0.5 | 9.7 | 390 | 0.2 | 0.90 | 0.045 | 0.073 | 0.076 | 0.076 |
| Ex. 5 | B | 5 | 4.2 | — | 0.5 | 0.55 | 0.030 | 0.032 | 0.032 | — |
| Ex. 6 | B | 15 | 4.5 | — | 0.5 | 0.49 | 0.058 | 0.081 | 0.081 | — |
| Ex. 7 | B | 80 | 5.7 | — | 0.7 | 0.45 | 0.047 | 0.056 | 0.066 | — |
| Ex. 8 | B | 0.5 | 4.1 | — | 0.5 | 0.32 | 0.26 | 0.40 | 0.44 | — |
| Ex. 9 | A | 5 | 25.1 | — | 0.2 | 3.5 | 0.035 | 0.045 | 0.045 | — |
| Ex. 10 | A | 15 | 27.4 | — | 0.3 | 3.5 | 0.032 | 0.042 | 0.042 | — |
| Ex. 11 | A | 80 | 27.7 | — | 0.5 | 3.4 | 0.028 | 0.028 | 0.032 | — |

TABLE 1-continued

| | Crosslinkable monomer | | Amount of polymer held (wt. %) | Performance of hydrophilized porous membrane | | | | | | |
|---|---|---|---|---|---|---|---|---|---|---|
| | | | | Knot strength (g/fil) | Water penetration pressure (Kg/cm²) | Water permeability (l/m² · hr · mmHg) | Dissolution (wt. %) | | | |
| Ex. | Kind* | Amount used (wt. parts) | | | | | 1 hr | 24 hr | 200 hr | 800 hr |
| Ex. 12 | A | 0.5 | 23.9 | — | 0.2 | 3.0 | 0.062 | 0.088 | 0.104 | — |

*A: N—hydroxymethylacrylamide
B: N,N'—methylenebisacrylamide

TABLE 2

| | Crosslinkable monomer | | Amount of polymer held (wt. %) | Performance of hydrophilized porous membrane | | | | | | |
|---|---|---|---|---|---|---|---|---|---|---|
| | | | | Knot strength (g/fil) | Water penetration pressure (Kg/cm²) | Water permeability (l/m² · hr · mmHg) | Dissolution (wt. %) | | | |
| Ex. | Kind* | Amount used (wt. parts) | | | | | 1 hr | 24 hr | 200 hr | 800 hr |
| Ex. 13 | C | 5 | 10.3 | — | 0.5 | 1.0 | 0.009 | 0.011 | 0.011 | 0.011 |
| Ex. 14 | C | 15 | 4.3 | — | 0.5 | 0.50 | 0.052 | 0.059 | 0.060 | — |
| Ex. 15 | D | 1 | 7.5 | — | 0.5 | 0.48 | 0.043 | 0.049 | 0.050 | — |
| Ex. 16 | C | 5 | 8.3 | — | 0.1 | 3.5 | 0.052 | 0.058 | 0.059 | — |
| Ex. 17 | A | 5 | 4.7 | — | 0.5 | 0.19 | 0.016 | 0.018 | 0.018 | — |
| Ex. 18 | A | 5 | 23.0 | 398 | 0.8 | 1.1 | 0.018 | 0.020 | 0.020 | — |
| Ex. 19 | A | 15 | 23.8 | 395 | 0.7 | 1.1 | 0.020 | 0.022 | 0.022 | — |
| Ex. 20 | A | 1 | 22.4 | 392 | 0.6 | 0.8 | 0.065 | 0.081 | 0.083 | — |
| Ex. 21 | A | 0.5 | 22.1 | 392 | 0.6 | 0.6 | 0.10 | 0.13 | 0.13 | — |

*A: N—hydroxymethylacrylamide
C: Triallyl isocyanurate
D: Divinylbenzene

What is claimed is:

1. A process for the production of a hydrophilized porous membrane, which comprises the steps of (A) holding at least diacetone acrylamide, a crosslinkable monomer, and a polymerization initiator on at least a part of the pore walls of a starting porous membrane of a polyolefin which has been rendered porous by a stretching technique, and (B) heating them to polymerize these monomers.

2. The process as claimed in claim 1, wherein the monomers are held on at least said part of the pore walls of the starting porous membrane by preparing a solution of the monomers dissolved in a solvent composed of water and/or an organic solvent, impregnating the starting porous membrane with the solution and then evaporating the solvent.

3. The process as claimed in claim 1, wherein the starting porous membrane is in the form of hollow fibers.

4. The process as claimed in claim 1, wherein the polyolefin is a polymer containing as a principal component thereof at least one monomer selected from the group consisting of ethylene, propylene, 4-methyl-1-pentene and 3-methyl-1-butene.

5. The process as claimed in claim 1, wherein the solubility of the crosslinkable monomer in water of 30° C. is 1 g/dl or greater.

* * * * *